(12) United States Patent  
Demuth et al.

(10) Patent No.: US 9,164,758 B2  
(45) Date of Patent: Oct. 20, 2015

(54) METHOD FOR SETTING CHANGE OPTIONS OF SOFTWARE SYSTEMS OF A SOFTWARE SYSTEM LANDSCAPE AND COMPUTER SYSTEM WITH SOFTWARE SYSTEMS HAVING CHANGE OPTIONS

(75) Inventors: Michael Demuth, Rauenberg (DE); Volker Schulz, Heppenheim (DE); Herbert Stegmuller, Bruchsal (DE)

(73) Assignee: SAP SE, Walldorf (DE)

( * ) Notice: Subject to any disclaimer, the term of this patent is extended or adjusted under 35 U.S.C. 154(b) by 1005 days.

(21) Appl. No.: 11/262,343

(22) Filed: Oct. 27, 2005

(65) Prior Publication Data

US 2006/0155832 A1 Jul. 13, 2006

(30) Foreign Application Priority Data

Oct. 27, 2004 (EP) ..................... 04025503

(51) Int. Cl.
*G06F 15/16* (2006.01)
*G06F 9/44* (2006.01)

(52) U.S. Cl.
CPC ....................... *G06F 8/71* (2013.01)

(58) Field of Classification Search
CPC ........................................................ G06F 8/71
USPC ................................................. 709/221, 220
See application file for complete search history.

(56) References Cited

U.S. PATENT DOCUMENTS

| | | | |
|---|---|---|---|
| 5,237,688 A | | 8/1993 | Calvert et al. |
| 5,495,610 A | * | 2/1996 | Shing et al. ................... 709/221 |
| 5,608,721 A | | 3/1997 | Natarajan et al. |
| 5,745,767 A | | 4/1998 | Rosen et al. |
| 5,778,389 A | * | 7/1998 | Pruett et al. ........................... 1/1 |
| 5,845,090 A | | 12/1998 | Collins, III et al. |
| 5,859,977 A | * | 1/1999 | Nishiyama et al. ........... 709/223 |

(Continued)

FOREIGN PATENT DOCUMENTS

| | | |
|---|---|---|
| JP | 2001265603 | 9/2001 |
| WO | WO-0163482 A2 | 8/2001 |
| WO | WO-03060718 A1 | 7/2003 |

OTHER PUBLICATIONS

Bawtree, Hugh , "A tool for managing change; Software Development", XP-002321302, (Aug. 2000), 18 pgs.

(Continued)

*Primary Examiner* — Jonathan Bui
(74) *Attorney, Agent, or Firm* — Schwegman Lundberg & Woessner, P.A.

(57) ABSTRACT

A method for setting change options of software systems of a software system landscape, wherein the systems are interconnected by logical transport paths for the transport of software services therebetween, the software services defining changes to at least one of the code and the data of at least one system, each system having change options that define changeability restrictions pertinent to the system, is described. The method includes providing an interface in each system, the interface allowing read and write access to the change options of the respective system from the outside of the system; providing a central control software system; providing an interface in the central system for communication with the interfaces of the systems; selecting a group of systems based on software service parameter data; and accessing the group of selected systems from the central system via the interfaces and centrally managing a change option in each system of the group.

13 Claims, 6 Drawing Sheets

(56) References Cited

U.S. PATENT DOCUMENTS

| | | | |
|---|---|---|---|
| 5,860,007 A | 1/1999 | Soni et al. | |
| 5,953,533 A | 9/1999 | Fink et al. | |
| 6,110,228 A * | 8/2000 | Albright et al. | 717/178 |
| 6,256,773 B1 | 7/2001 | Bowman-Amuah | |
| 6,263,358 B1 | 7/2001 | Lee et al. | |
| 6,308,173 B1 | 10/2001 | Glasser et al. | |
| 6,405,364 B1 | 6/2002 | Bowman-Amuah | |
| 6,513,132 B1 | 1/2003 | Suzuki | |
| 6,606,744 B1 | 8/2003 | Mikurak | |
| 6,662,357 B1 | 12/2003 | Bowman-Amuah | |
| 6,718,535 B1 | 4/2004 | Underwood | |
| 6,772,413 B2 | 8/2004 | Kuznetsov | |
| 7,020,690 B1 | 3/2006 | Haitsuka et al. | |
| 7,107,331 B2 * | 9/2006 | Gava et al. | 709/221 |
| 7,721,257 B2 | 5/2010 | Demuth et al. | |
| 7,725,891 B2 | 5/2010 | Demuth et al. | |
| 7,853,651 B2 | 12/2010 | Demuth et al. | |
| 7,877,730 B2 | 1/2011 | Demuth et al. | |
| 7,926,056 B2 | 4/2011 | Lier et al. | |
| 8,069,435 B1 | 11/2011 | Lai | |
| 8,234,621 B2 | 7/2012 | Killisperger et al. | |
| 8,839,185 B2 | 9/2014 | Demuth et al. | |
| 2001/0052074 A1 | 12/2001 | Pensak et al. | |
| 2002/0026592 A1 | 2/2002 | Gavrila et al. | |
| 2002/0103851 A1 | 8/2002 | Kikinis | |
| 2002/0129356 A1 * | 9/2002 | Hellerstein et al. | 717/177 |
| 2002/0156798 A1 * | 10/2002 | Larue et al. | 707/201 |
| 2002/0169878 A1 * | 11/2002 | Orenshteyn | 709/227 |
| 2002/0174164 A1 | 11/2002 | Hayashi | |
| 2002/0184398 A1 * | 12/2002 | Orenshteyn | 709/310 |
| 2002/0198725 A1 | 12/2002 | Piepenbrink et al. | |
| 2003/0040974 A1 * | 2/2003 | Chauvin et al. | 705/26 |
| 2003/0084350 A1 | 5/2003 | Eibach et al. | |
| 2003/0093516 A1 | 5/2003 | Parsons et al. | |
| 2003/0142627 A1 | 7/2003 | Chiu et al. | |
| 2004/0010708 A1 | 1/2004 | Johnson et al. | |
| 2004/0060044 A1 | 3/2004 | Das et al. | |
| 2004/0073720 A1 | 4/2004 | Clough et al. | |
| 2004/0081183 A1 | 4/2004 | Monza et al. | |
| 2004/0117795 A1 | 6/2004 | Wang et al. | |
| 2004/0267935 A1 | 12/2004 | Patiejunas | |
| 2005/0080888 A1 | 4/2005 | Walter | |
| 2005/0209732 A1 | 9/2005 | Audimoolam et al. | |
| 2005/0210501 A1 | 9/2005 | Zigmond et al. | |
| 2005/0223047 A1 * | 10/2005 | Shah et al. | 707/201 |
| 2006/0026278 A1 | 2/2006 | Yu | |
| 2006/0080653 A1 | 4/2006 | Siwatu et al. | |
| 2006/0112189 A1 | 5/2006 | Demuth et al. | |
| 2006/0117311 A1 | 6/2006 | Demuth et al. | |
| 2006/0123392 A1 | 6/2006 | Demuth et al. | |
| 2006/0123407 A1 | 6/2006 | Demuth et al. | |
| 2006/0143614 A1 | 6/2006 | Lier et al. | |
| 2006/0149813 A1 | 7/2006 | Janik | |
| 2006/0164257 A1 | 7/2006 | Giubbini | |
| 2006/0203812 A1 | 9/2006 | Demuth et al. | |
| 2007/0038610 A1 | 2/2007 | Omoigui | |
| 2007/0233854 A1 | 10/2007 | Bukovec et al. | |
| 2008/0183840 A1 | 7/2008 | Khedouri et al. | |
| 2010/0058287 A1 | 3/2010 | Sundararajan et al. | |

OTHER PUBLICATIONS

Hodgson, Alan, "Intel eBusiness Engineering Release Management and Application Landing", XP-002321303 *Intel Technology Journal*, Q4, (2000),1-9.

IBM Document Center, "Publication information", XP-2325608, (Observed Apr. 21, 2005),1 pg.

Szallies, Constantin, "On Using the Observer Design Pattern", XP-002323533, (Aug. 21, 1997),9 pgs.

"U.S. Appl. No. 11/261,816 Non-Final Office Action mailed Dec. 30, 2008", 14 pgs.

"U.S. Appl. No. 11/262,442, Non-Final Office Action mailed Jan. 7, 2009", 20 pgs.

"U.S. Appl. No. 11/262,543, Non-Final Office Action mailed Dec. 30, 2008", 13 pgs.

IBM Corporation, *Tivoli software distribution users guide 4.1*, (636 pages) XP-002321301 Relevant pgs, as per Dr. Verhasselt—for matters 78EP04, 78EP05, 78EP06: pp. 251, 262, 407, 436, 439, 443. For matter 78EP07: pp. 5, 10, 11, 163, 176, 177; For matter 78EP10: pp. 1, 4, 12, 251, 252, 449, 450, 452, 577.,(2001),1, 4, 5, 10, 11, 12, 251, 252, 262, 407, 436, 439, 443, 449, 450, 452, 577.

IBM Corporation, *IBM Tivoli Configuration Manager—User's Guide for Software Distribution—Version 4.2*, XP-2325607,(Oct. 2002),1-358.

McFarland Metzger, Sue S., "SAP R/3 change and transport management : the official SAP guide / (SAP R/3—Systemlandschaft Implementieren und warten)", XP-002325774, (Jan. 12, 2000),419, 461, 465.

Schneider-Neureither, Andreas (., "SAP System Landscape Optimization", SAP Press, 2004, ISBN 1-59229-026-4, (2004),73-78; 96-100.

"U.S. Appl. No. 11/261,816, Final Office Action mailed May 14, 2009", 11 pgs.

"U.S. Appl. No. 11/261,816, Response filed Mar. 18, 2009 to Non-Final Office Action mailed Dec. 30, 2008", 15 pgs.

"U.S. Appl. No. 11/262,442, Response filed Apr. 27, 2009 to Non Final Office Action mailed Jan. 7, 2009", 17 pgs.

"U.S. Appl. No. 11/262,543, Final Office Action mailed Apr. 27, 2009", 13 Pgs.

"U.S. Appl. No. 11/262,543, Response filed Mar. 9, 2009 to Non-Final Office Action mailed Dec. 30, 2008", 14 pgs.

"U.S. Appl. No. 11/262,543, Response filed Jun. 15, 2009 to Final Office Action mailed Apr. 27, 2009", 11 pgs.

"U.S. Appl. No. 11/261,816, Advisory Action mailed Jul. 28, 2009", 3 pgs.

"U.S. Appl. No. 11/261,816, Notice of Allowance mailed Sep. 28, 2009", 11 Pgs.

"U.S. Appl. No. 11/261,816, Response filed Aug. 11, 2009 to Advisory Action mailed Jul. 28, 2009", 11 pgs.

"U.S. Appl. No. 11/261,816, Response filed Jul. 10, 2009 to Final Office Action mailed May 14, 2009", 12 pgs.

"U.S. Appl. No. 11/262,043, Non-Final Office Action mailed Oct. 27, 2009", 11 Pgs.

"U.S. Appl. No. 11/262,143, Non-Final Office Action mailed Oct. 8, 2009", 10 pgs.

"U.S. Appl. No. 11/262,442, Non-Final Office Action mailed Aug. 31, 2009", 18 pgs.

"U.S. Appl. No. 11/262,442, Response filed Nov. 18, 2009 to Non Final Office Action mailed Aug. 31, 2009", 13 pgs.

"U.S. Appl. No. 11/262,543, Advisory Action mailed Jul. 1, 2009", 3 pgs.

"U.S. Appl. No. 11/262,543, Notice of Allowance mailed Sep. 15, 2009", 10 Pgs.

"U.S. Appl. No. 11/262,543, Pre-Appeal Brief Request mailed Jul. 20, 2009", 5 pgs.

"U.S. Appl. No. 11/261,816, Notice of Allowance mailed Jan. 12, 2010", 5 pgs.

"U.S. Appl. No. 11/261,816, Supplemental Examiner Interview Summary filed Nov. 11, 2009", 7 pgs.

"U.S. Appl. No. 11/262,043, Response filed Jan. 21, 2010 to Non Final Office Action mailed Oct. 27, 2009", 10 pgs.

"U.S. Appl. No. 11/262,143, Appeal Brief filed Aug. 18, 2010", 29 pgs.

"U.S. Appl. No. 11/262,143, Appeal Decision mailed Nov. 4, 2013", 8 pgs.

"U.S. Appl. No. 11/262,143, Decision on Pre-Appeal Brief Request mailed Jul. 29, 2010", 2 pgs.

"U.S. Appl. No. 11/262,143, Examiner Interview Summary mailed Feb. 25, 2014", 3 pgs.

"U.S. Appl. No. 11/262,143, Examiner's Answer to Appeal Brief mailed Nov. 12, 2010", 24 pgs.

"U.S. Appl. No. 11/262,143, Final Office Action mailed Mar. 25, 2010", 14 pgs.

"U.S. Appl. No. 11/262,143, Non Final Office Action mailed Feb. 4, 2014", 6 pgs.

"U.S. Appl. No. 11/262,143, Pre-Appeal Brief Request filed May 11, 2010", 5 pgs.

(56) References Cited

OTHER PUBLICATIONS

"U.S. Appl. No. 11/262,143, Response filed Dec. 11, 2009 to Non Final Office Action mailed Oct. 8, 2009", 14 pgs.
"U.S. Appl. No. 11/262,326, Final Office Action mailed Oct. 13, 2010", 12 pgs.
"U.S. Appl. No. 11/262,326, Non-Final Office Action mailed Apr. 26, 2010", 13 pgs.
"U.S. Appl. No. 11/262,326, Notice of Allowance mailed Dec. 13, 2010", 10 pgs
"U.S. Appl. No. 11/262,326, Response filed Jul. 26, 2010 to Non Final Office Action mailed Apr. 26, 2010", 13 pgs.
"U.S. Appl. No. 11/262,326, Response filed Nov. 9, 2010 to Final Office Action mailed Oct. 13, 2010", 13 pgs.
"U.S. Appl. No. 11/262,442, Final Office Action mailed Apr. 19, 2010", 8 pgs.
"U.S. Appl. No. 11/262,442, Notice of Allowance mailed Sep. 10, 2010", 9 pgs.
"U.S. Appl. No. 11/262,442, Response filed Jun. 9, 2010 to Final Office Action mailed Apr. 19, 2010", 16 pgs.
"U.S. Appl. No. 11/262,543, Decision on Pre-Appeal Brief Request mailed Aug. 20, 2009", 2 pgs.
"U.S. Appl. No. 11/262,543, Examiner Interview Summary mailed Aug. 17, 2009", 2 pgs.
"U.S. Appl. No. 11/262,543, Notice of Allowance mailed Jan. 7, 2010", 5 pgs.
"U.S. Appl. No. 11/262,143, *Ex Parte Quayle* Action mailed May 14, 2014", 4 pgs.
"U.S. Appl. No. 11/262,143, Notice of Allowance mailed Aug. 4, 2014", 8 pgs.
"U.S. Appl. No. 11/262,143, Response filed Apr. 30, 2014 to Non Final Office Action mailed Feb. 4, 2014", 10 pgs.
"U.S. Appl. No. 11/262,143, Response filed Jul. 11, 2014 to *Ex Parte Quayle* Action mailed May 14, 2014", 9 pgs.
Dangelmaier, W, et al., "CIDP—On Workflow-Based Client Integration in Complex Client Oriented Design Projects", SIGGROUP Bulletin, vol. 20, No. 1, (Apr. 1999), 20-25.
Richards, B., "RTP: A transport layer implementation project", JCSC 16,4, (May 2001), 134-141.

\* cited by examiner

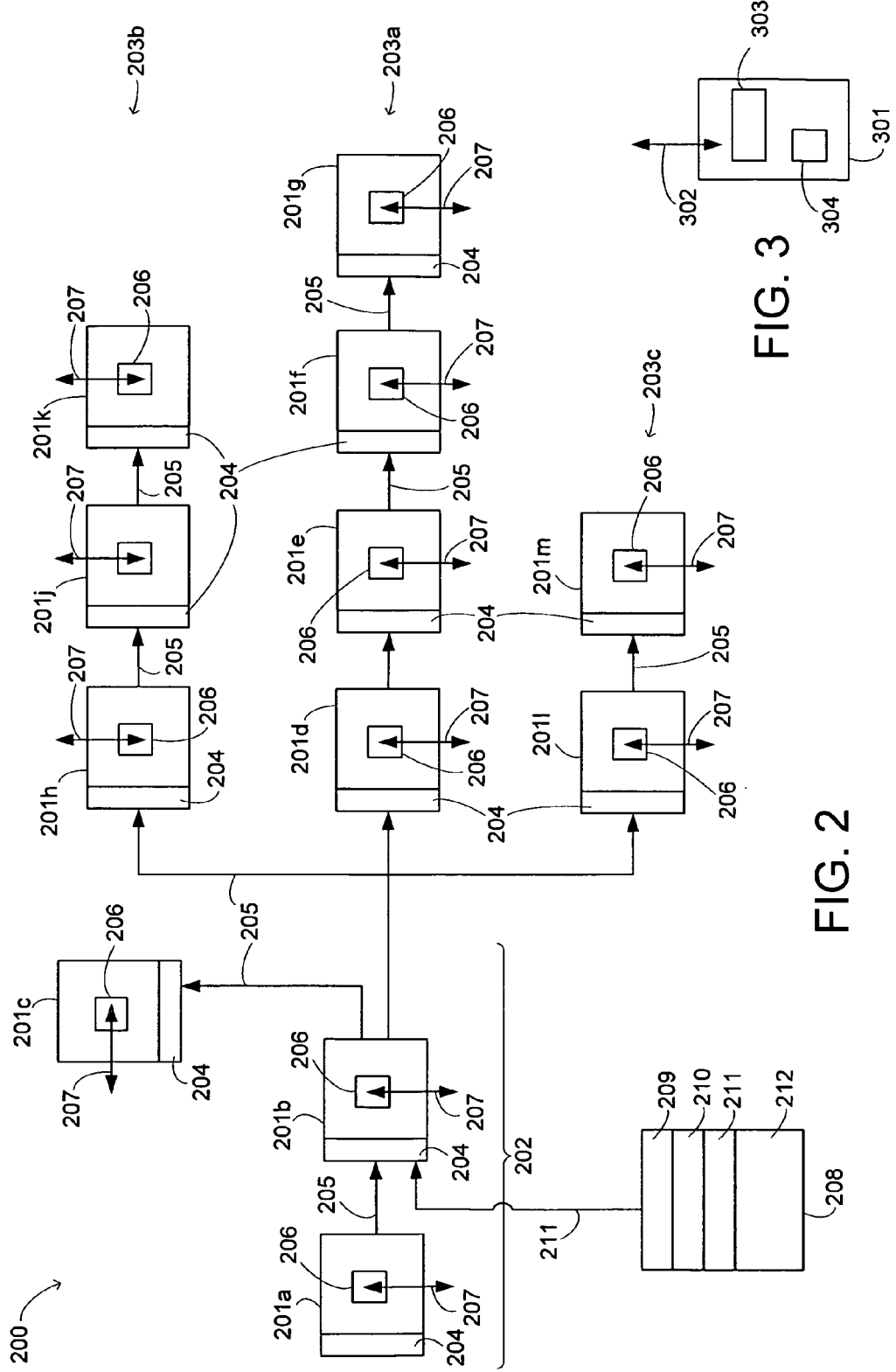

METHOD FOR SETTING CHANGE OPTIONS OF SOFTWARE SYSTEMS OF A SOFTWARE SYSTEM LANDSCAPE AND COMPUTER SYSTEM WITH SOFTWARE SYSTEMS HAVING CHANGE OPTIONS

CLAIM OF PRIORITY

The present patent application claims the priority benefit of the filing date of European Application (EPO) No. 04 025 503.6 filed Oct. 27, 2004, which is incorporated herein by reference.

TECHNICAL FIELD

This application relates generally to servicing of a software system landscape, and more particularly to a method for setting change options of software systems of a software system landscape and to a computer system with software systems having change options.

BACKGROUND

Complex software like applicant's SAP R/3 Release 4.5 (SAP) requires customization, e.g. selection of predefined functionality, and adaptation, e.g. addition of or amendment to functionality, as well as other servicing like program and data updates, cf. "SAP System Landscape Optimization" by A. Schneider-Neureither (Ed.), SAP Press, 2004, ISBN 1-59229-026-4, and "SAP R/3 Änderungs-und Transportmanagement" by Metzger and Röhrs, Galileo Press GmbH, Bonn, Germany, $4^{th}$ reprint 2004, ISBN 3-934358-42-X.

Before such servicing may be performed, however, it has to be assured that the customizations, adaptations, program and data updates etc. are free of errors and integrate flawlessly into the software and data environment. In a factory for instance servicing errors are bound to result in costly workflow disruptions due to software malfunction or data corruption.

Such complex software may therefore be implemented in form of separate logical systems that together form a system landscape. A typical implementation of the aforementioned SAP software for instance may, cf. FIG. 1, comprise a development system 101 for customizing and development work, a quality assurance system 102 for testing functionality using representative test data, a training system 103 for training new users, and several productive systems 104, e.g. each for a different factory, for actual productive use. Other or additional users and systems may be defined according to the particular requirements.

The logical systems are identical in large parts, function autonomously and may be executed on a single computer. The quality assurance system 102 for example resembles the productive system 104 in that it provides all the functionality, its present data and additionally special test data. New customization settings or adaptations may thus be thoroughly tested in the quality assurance system 102 without jeopardizing the productive system 104. Likewise, the training system 103 resembles the productive system 104 in that it provides some of the functionality and special test data. A new user using the training system 103 may thus become accustomed to the functionality and observe the effect of his actions, albeit without disturbing the productive system 104.

A transport management system connects the logical systems and serves to forward approved services to the next stage of the system landscape via logical transport paths 105. A service may for example be approved in the development system 101 for export. It will then be forwarded to an input buffer of the quality assurance system 102. Import into the quality assurance system 102 is approved manually by an operator. Once the service has been imported into the quality assurance system 102, it will automatically be forwarded to an import buffer of the training system 103 and the productive systems 104 where it will be imported following manual approval by an operator.

Additionally, the operator may also effect a software service directly by manually performing customizations, adaptations, program and data updates etc. in a system. Such direct software servicing does not require a formal software service to be sent through the systems in the system landscape.

For the sake of system stability, in particular with respect to the productive system, it is desirable to restrict the changeability of one or more systems not only on a user or operator basis, but also on a system basis so that a user or operator who principally has sufficient authorization to approve an import or effect a change may be prohibited from doing so in a particular system. It is known to define the changeability on a system basis by change options that are kept within each system. If the change options of a system need to be altered, a sufficiently authorized operator has to log in into the system and alter the change options manually. This is time consuming, in particular when different systems are affected by different projects, and bears the risk of errors.

SUMMARY

In one aspect of the invention, a method is provided for setting change options of software systems of a software system landscape, wherein the systems are interconnected by logical transport paths for the transport of software services therebetween, the software services defining changes to at least one of the code and the data of at least one system, each system having change options that define changeability restrictions pertinent to the system, the method including providing an interface in each system, the interface allowing read and write access to the change options of the respective system from the outside of the system; providing a central control software system; providing an interface in the central system for communication with the interfaces of the systems; selecting a group of systems based on software service parameter data; and accessing the group of selected systems from the central system via the interfaces and centrally managing a change option in each system of the group.

In a further aspect of the invention, a computer system is provided comprising: a plurality of logical systems, each logical system having a change option that defines a changeability restriction pertinent to the system; an interface in each system for read and write access to the change options of the respective system from the outside of the system; logical transport paths interconnecting the logical systems to form a software system landscape and to transport software services between the systems, the software services defining changes to at least one of the code and the data of at least one system, a central control software system with an interface for communication with the interfaces of the logical systems; means for selecting a group of systems based on software service parameter data; and means for accessing the group of selected systems from the central system via the interfaces and for centrally managing a change option in each system of the group.

In a still further aspect of the invention, a computer program product is provided, the computer program product comprising on a storage medium a computer code that upon execution on a computer system performs the method according to the invention.

BRIEF DESCRIPTION OF THE DRAWINGS

Further embodiments of the invention are inferable from the following description and the claims.

FIG. 2 illustrates a system landscape according to an example embodiment of the invention.

FIG. 3 illustrates a central control system according to an example embodiment of the invention.

DETAILED DESCRIPTION

Figure 1:
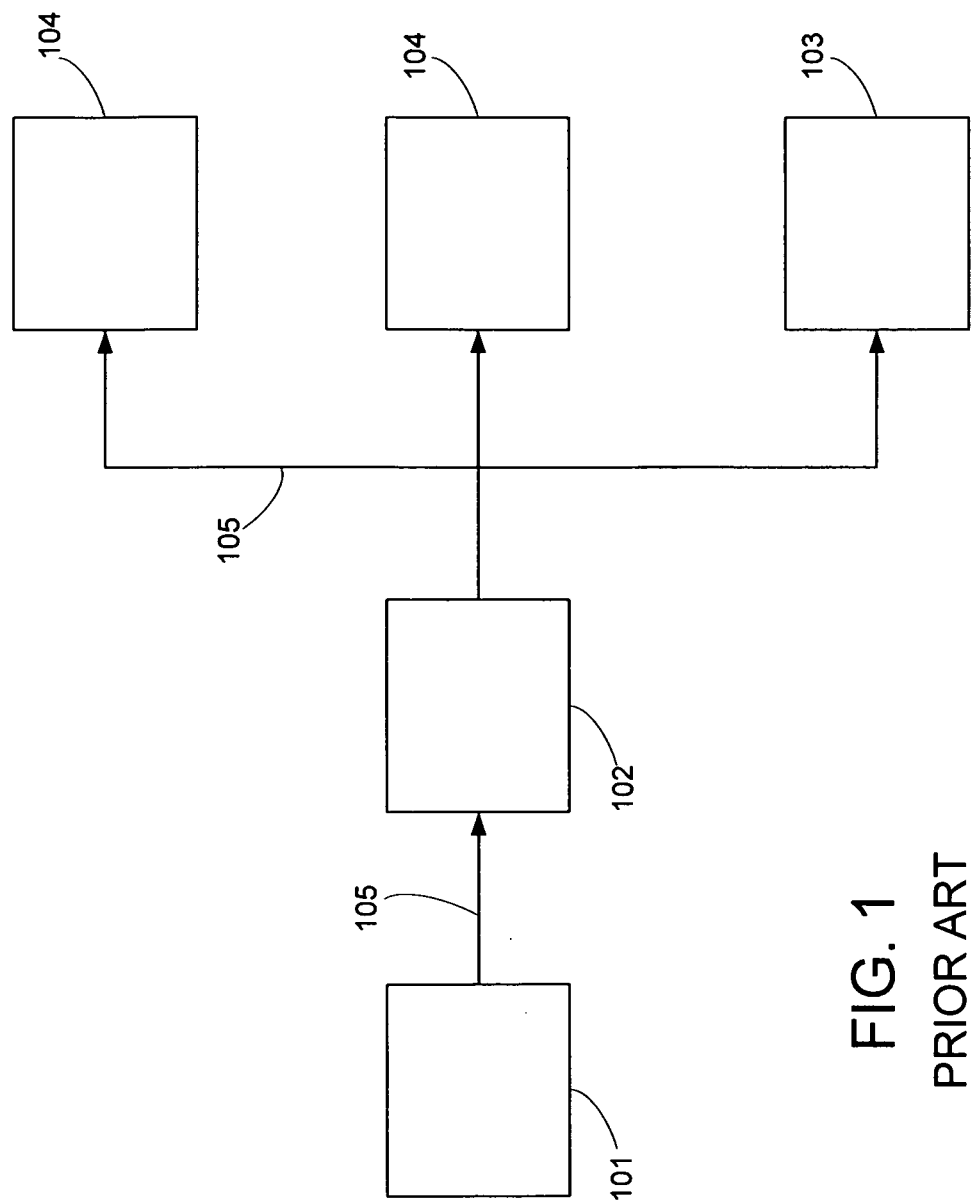
FIG. 1 shows a system landscape of the prior art.

The example embodiment shown in FIG. 2 illustrates an SAP R/3 Release 4.5 system landscape 200 with separate logical systems 201 that are here divided into a global part 202, e.g. at a main development and production facility, and local parts 203a, 203b, 203c, e.g. at other production facilities.

The global part 202 comprises at least a development system 201a for customizing and development work, a quality assurance system 201b for testing functionality using representative test data, and a productive system 201c for actual productive use.

The local part 203a comprises a development system 201d for customizing and development work of local adaptations to SAP, e.g. to meet different legal requirements if part 203a is localized in a different country than the global part 202. The local part 203a further comprises a quality assurance system 201e for testing functionality using representative test data, a training system 201f for training new users, and a productive system 201g for actual productive use.

The local part 203b comprises a development system 201h, a quality assurance system 201j and a productive system 201k, but no training system. The local part 203c is a two system landscape comprising a development system 201l and a productive system 201m only.

The system landscape may be different according to the actual requirements. Fewer or more, different or differently connected or grouped systems 201 may be defined as needed.

The logical systems 201 are identical in large parts and function autonomously. The quality assurance system 201j for example resembles the productive system 201k in that it provides all the functionality, its present data and additionally special test data. New customization settings or adaptations may thus be thoroughly tested in the quality assurance system 201j without jeopardizing the productive system 201k.

Each system 201 comprises an import buffer 204. A transport management system connects the logical systems 201 and serves to effect software services across the system landscape via logical directional transport paths 205. A service may for example relate to customization of a system 201, e.g. a selection of predefined functionality in the system 201, or an adaptation of a system 201, e.g. an addition of or amendment to functionality, or to program and data updates or the like.

Each system 201 further comprises a set 206 of change options. The change options define changeability restrictions for the respective system and are stored in a table or data base entry. Preferably, each set 206 comprises at least one change option that restricts the changeability of the respective system for all users and operators irrespective of their level of authorization, so that a user or operator who principally has sufficient authorization to approve an import or effect a change may be prohibited from doing so. Each set 206 also comprises at least one change option that restricts the changeability of the respective system for certain users or allows changes by users having at least a predetermined level of authorization.

In particular, the set 206 comprises one or more of the following change options:

A change option that, when set, inhibits any change to the respective system, irrespective of the user authorization. If changes to the system are desired, this change option needs to be cleared first.

A change option that, when set, inhibits any change to a particular part of the respective system, e.g. all or a part of the customization settings, program code, or the data, in particular those parts that provides fundamental functionality.

A change option that, when set, allows changes by software services, imported or directly effected, if they carry a particular identifier. The identifier indicates that the software service belongs to a particular project.

A change option that implements an authorization hierarchy for users and/or operators, defining which particular users respectively operators or which authorization level of users respectively operators is allowed to effect certain changes or types of changes, either by approving import of a software service or making changes to the system directly.

A system's change options may be directly set, cleared, defined, specified etc., e.g. managed, by a sufficiently authorized operator who is logged in into the system.

A system's change options may also be managed from the outside of the system. For this purpose, the set 206 of each system 201 is accessible via an interface 207. The interface 207 allows access to the set 206 from a central system 301, cf. FIG. 3, that comprises a compatible interface 302.

The central system 301 holds a copy 303 of the sets 206 of all systems 201. The copy 303 is available for read and write access to an operator of the central system 301, and also to a program 304 in the central system 301 that manages the system service. The copy 303 is held up to date. If a change option of a system 201 is directly set, cleared, etc., the respective system 201 may inform the central system 301 of such change. Alternatively, the central system 301 accesses the systems 201 periodically to update the copy 303. If no copy 303 is present, the central system 301 accesses a particular system 201 if its change options are required e.g. for display to the operator or for the program 304.

The systems 201 of each part 202, 203a, 203b, 203c and the central system 301 may be located and simultaneously run in a single computer, but are distributed across separate hardware. The global part 202 and the local parts 203a, 203b, 203c each run on physically separate computer systems, which themselves may comprise different computers.

Figure 4:
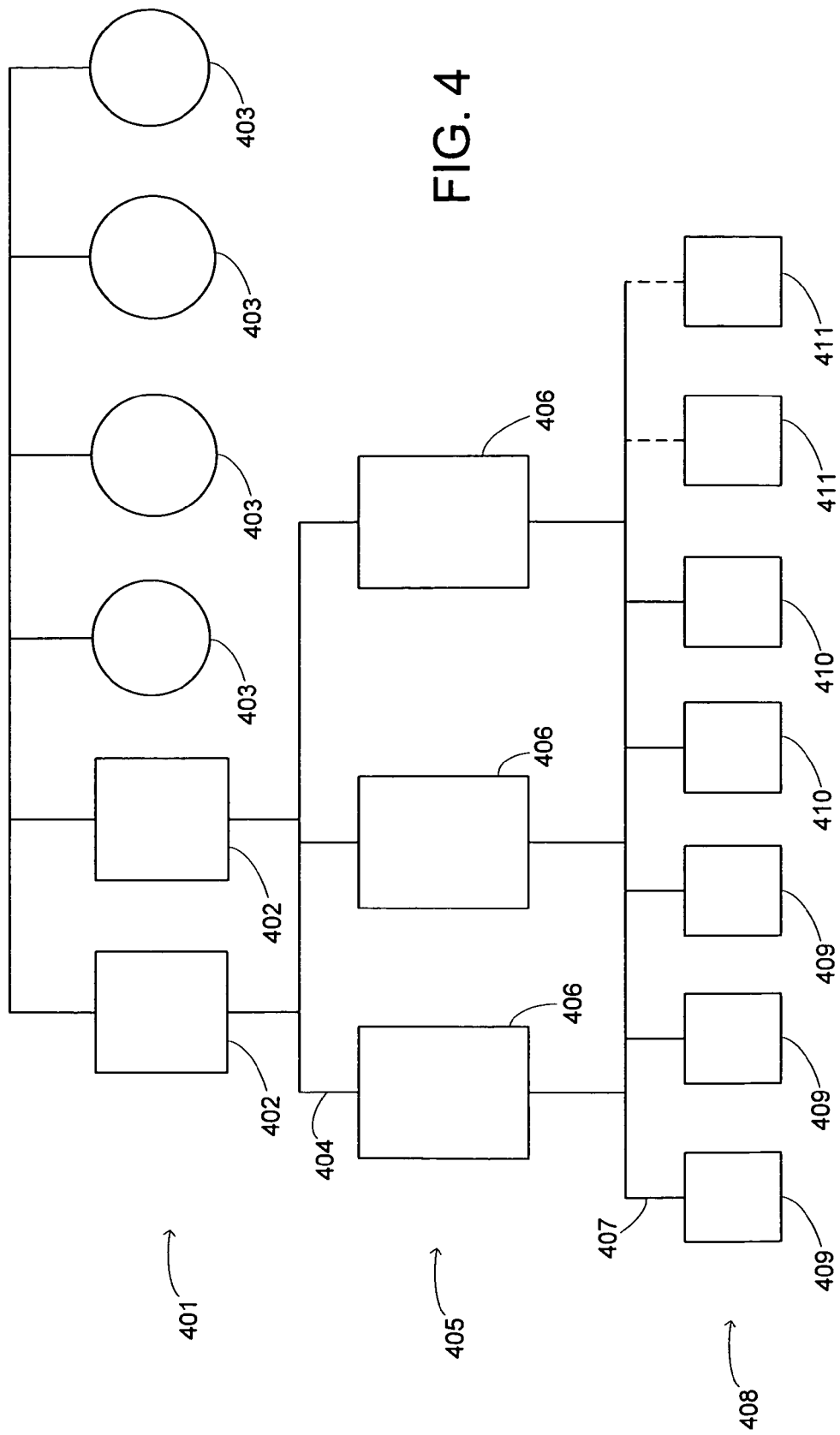
FIG. 4 shows an example embodiment of the hardware of a computer system according to an example embodiment of the invention.

An example implementation of the local part 203a may comprise, cf. FIG. 4, a data base layer 401 for storing and retrieving business data like a factory inventory, employee data, sales figures etc. The data base layer 401 comprises one or more data base servers 402 and four data bases 403, one for each of the systems 201d, 201e, 201f and 201g.

Connected to the data base layer 401 by a suitable network 404, e.g. a LAN, is an application layer 405 for execution of the software of the systems 201d, 201e, 201f and 201g. The application layer 405 comprises one or more application servers 406.

Finally, connected to the application layer 405 by a suitable network 407, e.g. a LAN, is a presentation layer 408 for the graphical user interface (GUI). The presentation layer 408 may comprise dumb terminals 409, Personal Computers 410 and/or wireless access devices 411 like PDAs.

Figure 5:
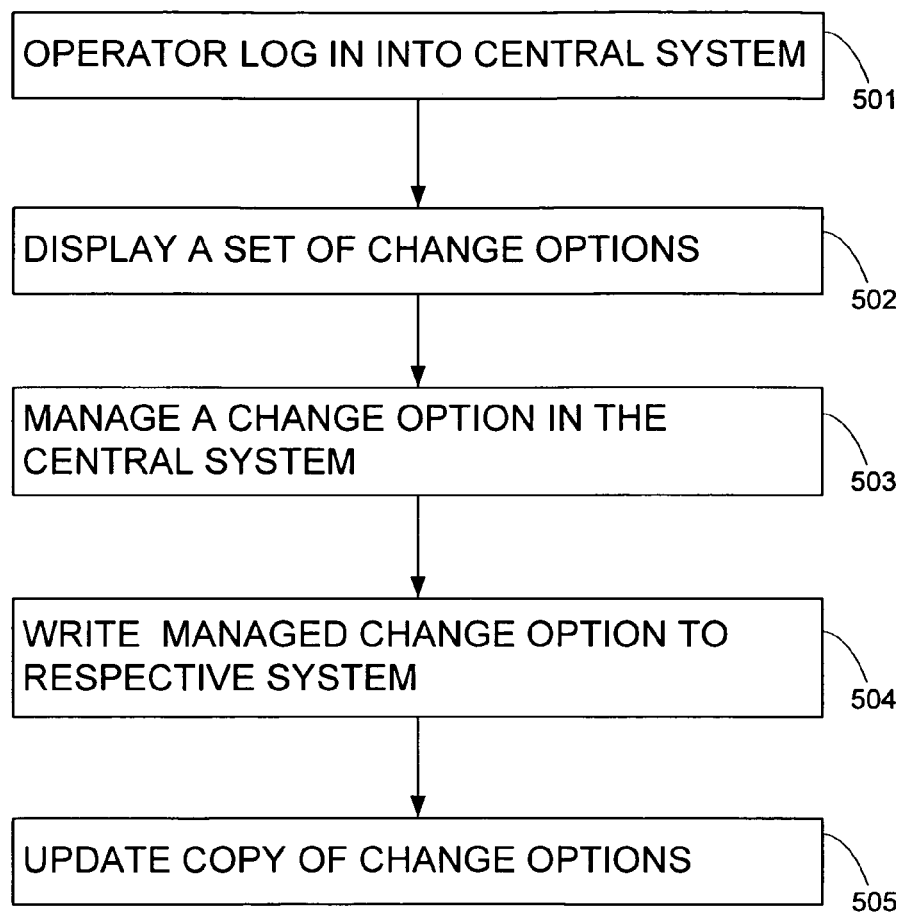
FIGS. 5, 6 and 7 each show a flow diagram of a method according to an example embodiment of the invention.
Figure 6:
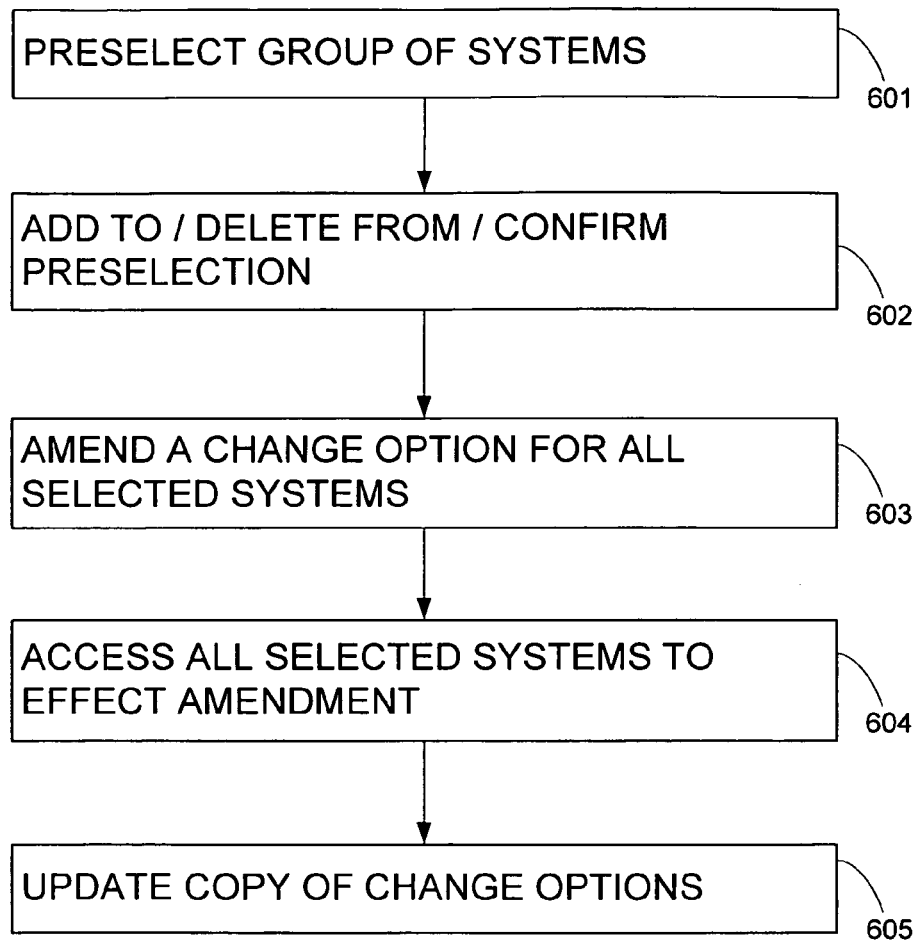

The method according to an example embodiment of the invention is now described with reference to FIGS. 5, 6, 7.

An operator authorizes himself 501 in the central system 301 for use of the program 304. The program 304 displays 502 the set 206 of a system 201 selected by the operator. The operator sets, clears, defines, specifies 503 a change option of the set 206. The central system 301 then accesses 504 the respective change option to effect the operator's amendment in the system 201. The central system 301 updates 505 the copy 303. The operator may amend one or more change options before they are communicated to the selected system 201.

The operator may also select a group of systems 201. In this case, the program 304 preselects the group of systems 201 based on software service parameter data, see operation 601 in FIG. 6. In particular, the preselected group of systems 201 comprises all systems 201 affected by a particular project; in FIG. 2, only the systems 201h, 201j and 201k of local part 203b may belong to a project while the other systems do not, so that the preselected group is comprised of the systems 201h, 201j and 201k in this example. The operator may be given an opportunity to add or delete systems 201 from the preselected group or to confirm the preselection, thereby defining 602 a selected group of systems 201. The operator then amends 603 a change option for all systems 201 of the selected group. The central system 301 then accesses 604 the respective change option in each system 201 of the preselected group of systems 201 to effect the operator's amendment. The central system 301 updates 605 the copy 303. The operator may amend one or more change options before they are communicated to the selected system 201.

In a further embodiment, the program 304 suggests predefined change options for a system 201 or group of systems 201. The suggestions may be stored in a table and define standard values for a project, e.g. the adaptation of the systems 201h, 201j, 201k of part 203b to new legislation. Upon completion of the project, the program 304 suggests to undo the amendments to the change options performed at the beginning or a project. The program 304 may suggest amendments automatically and request an operator to log in and approve the suggestions.

Once the change options are configured, the systems 201 respond as follows to change requests.

Figure 7:
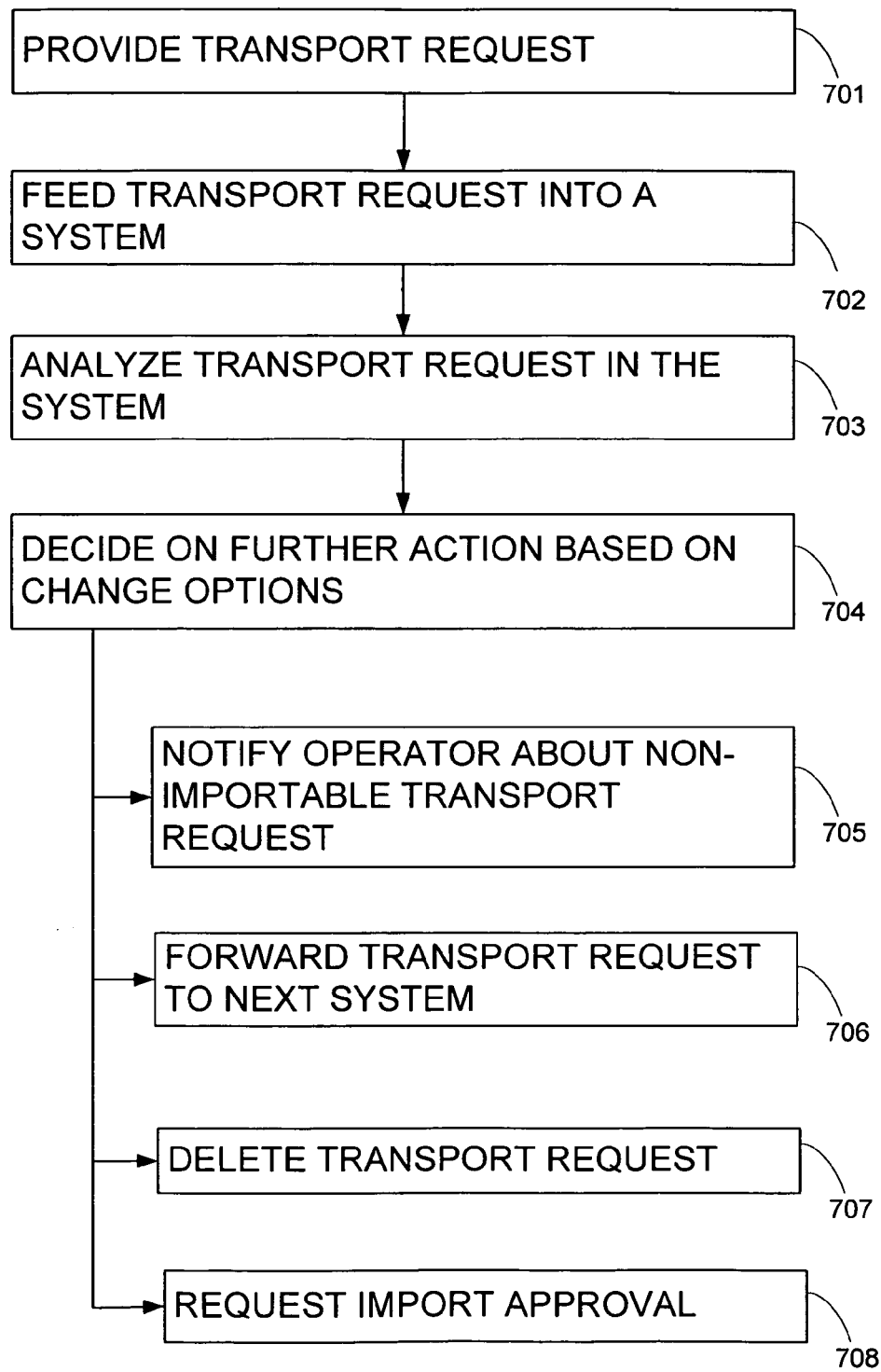

Referring to FIG. 7, a software service is provided 701 using a transport request 208. The transport request 208 is structured data that comprises an identifier 209, e.g. DEVK900251, a project identifier 210, general information 211 regarding the service, e.g. indicating that the service is a program patch, and service data 212, e.g. a piece of program code for a patch. The transport request 208 is fed 702 into the import buffer 204 of one of the systems 201, e.g. the quality assurance system 201b of the global part 202. This initial feeding occurs from the development system 201a through a transport path 205, but may also be effected manually as shown by path 211.

At operation 703, the system 201b detects the transport request 208, accesses at least a part of its data, in particular the identifiers 209, 210 and the general information 211, and decides 704 based on its change options in the set 206 how to proceed. Preferably, the options to proceed comprise one or more of the following: notifying 705 the operator that a software service is in the import buffer that may not be imported; forwarding 706 the transport request 208 to the next system 201; deleting 707 the transport request 208; requesting 608 the operator to approve the import.

Although the foregoing has been a description of an example embodiment of the invention, it will be apparent to those skilled in the art upon review of this disclosure that numerous variations and modifications may be made in the invention. For example, instead of using SAP R/3 Release 4.5, other SAP and non-SAP systems may benefit from the invention.

What is claimed is:

1. A method of setting change options of software systems in a software system landscape, at least one software system comprising code and data, the software systems being interconnected by logical transport paths for transport of software services therebetween, the software services defining changes to at least one of the code and the data of the at least one software system, each software system having a set of change options that define changeability restrictions pertinent to the respective system, the set of change options allowing or inhibiting changes of the code and the data of the respective system, the method comprising:
    reading, by a single central server, the set of change options from each of the systems;
    storing the change options from each of the systems in the single central server;
    writing, from the single central server, an updated set of change options to each of the respective systems through an interface in each of the respective systems from outside of each of the respective systems;
    communicating with the interfaces of the systems through an interface on the central server;
    periodically updating the single central server, from a respective one of the systems, with any local changes made to the respective one of the systems;
    selecting a group of the systems based on software service parameter data;
    accessing the group of selected systems from the single central server via the interfaces of the group of selected systems and centrally managing, from the single central server, the set of change options in each system of the group;
    holding a copy of the sets of change options of all of the selected systems in the single central server;
    implementing, by at least one change option in one of the set of change options for each of the systems a hierarchy of users and/or operators, the at least one change option defining which particular users and/or operators or an authorization level of users and/or operators allowed to affect certain changes or types of changes, either by approving import of one of the software services or making the changes to the system directly; and
    defining a customization, adaptation, program or data update by one of the software services for the selected systems.

2. The method of claim 1, wherein the managing of the set of change options comprises one or more of the group consisting of setting, clearing, defining, and specifying the at least one change option.

3. The method of claim 1, wherein a list of systems that are affected by a project is used as the software service parameter data and systems belonging to a particular software service project are selected to form the group.

4. The method of claim 1, further comprising storing the software service parameter data in the single central server.

5. The method of claim 1, further comprising managing, from the single central server, the set of change options identically in each system of the group.

6. The method of claim 1, further comprising managing, from the single central server, the set of change options of each system of the selected group of systems according to a predefined table for the group.

7. A computer system comprising:
a plurality of logical systems, each logical system having a set of change options that defines a changeability restriction pertinent to the system, and each system further comprising code and data, the code to be executed by the system;
a single central computer to couple to each of the logical systems from outside of the logical systems;
an interface in each logical system to read, from the single central computer, the change options of the respective system the single central computer to store the change options of each of the logical systems;
logical transport paths interconnecting the logical systems to the single central computer to form a software system landscape and to transport software services between the logical systems and the single central computer, the software services defining changes to at least one of the code and the data of at least one of the logical systems;
an interface on the single central computer to communicate with the interfaces of each of the logical systems and to periodically receive updates from each of the logical systems to the single central computer, of local changes made to a respective one of the logical systems, the single central computer further to write, through the interface, an updated set of change options to each of logical systems;
a program in the central computer for selecting a group of systems based on software service parameter data; and
wherein the central computer accesses the group of selected systems via the interfaces of the group of selected systems and for centrally manages the set of a change options in each system of the group; wherein the single central computer holds a copy of the sets of change options of all of the selected systems in the single central computer; wherein at least one change option in one of the set of change options for each of the systems implements a hierarchy of users and/or operators, the at least one change option defining which particular users and/or operators or an authorization level of users and/or operators allowed to affect certain changes or types of changes, either by approving import of one of the software services or making the changes to the system directly; and wherein one of the software services define a customization, adaptation, program or data update by one of the software services for the selected systems.

8. The computer system of claim 7, wherein managing the set of change options comprises one or more of the group consisting of setting, clearing, defining, and specifying the set of change options in each system of the group.

9. The computer system of claim 7, wherein the software service parameter data comprises a list of systems that are affected by a project and the group is comprised of systems belonging to a particular software service project.

10. The computer system of claim 7, wherein the single central computer comprises the software service parameter data.

11. The computer system of claim 7, wherein the single central computer is to manage the set of change options in each system of the group identically.

12. The computer system of claim 7, wherein the single central computer is to manage the sets of change options of the systems of the selected group of systems according to a predefined table for the group.

13. A computer program product comprising a computer-readable storage device storing a computer code that upon execution on a computer system performs operations for setting change options of software systems of a software system landscape, at least one software system comprising code and data, wherein the software systems are interconnected by logical transport paths for transport of software services therebetween, the software services defining changes to at least one of the code and the data of the at least one software system, each software system having a set of change options that define changeability restrictions pertinent to the respective system, the set of change options allowing or inhibiting changes of the code and the data of the respective system, the operations comprising:
reading, by a single central server, the set of change options from each of the systems;
storing the change options from each of the systems in the single central server;
writing, from the single central server, an updated set of change options to each of the respective systems through an interface in each of the respective systems from outside of each of the respective systems;
communicating with the interfaces of the systems through an interface on the central server;
periodically updating the single central server, from a respective one of the systems, with any local changes made to the respective one of the systems;
selecting a group of the systems based on software service parameter data;
accessing the group of selected systems from the single central server via the interfaces and centrally managing, from the single central server, the set of change options in each system of the group;
holding a copy of the sets of change options of all of the selected systems in the single central server;
implementing, by at least one change option in one of the set of change options for each of the systems a hierarchy of users and/or operators, the at least one change option defining which particular users and/or operators or an authorization level of users and/or operators allowed to affect certain changes or types of changes, either by approving import of one of the software services or making the changes to the system directly; and
defining a customization, adaptation, program or data update by one of the software services for the selected systems.

* * * * *